United States Patent [19]
Watanabe et al.

[11] 3,888,737
[45] June 10, 1975

[54] PROCESS OF PRODUCING L-LYSINE USING MIXED MICROORGANISMS

[75] Inventors: Kiyoshi Watanabe; Tamotsu Hirakawa; Kenji Takahara; Yoshio Nakamura; Sueo Iwasaki; Tutomu Tanaka, all of Hyogo, Japan

[73] Assignee: Kanegafuchi Chemical Industries Co., Ltd., Osaka, Japan

[22] Filed: Feb. 22, 1974

[21] Appl. No.: 445,041

[30] Foreign Application Priority Data
Feb. 22, 1973   Japan................................ 48-21982
June 22, 1973   Japan................................ 48-71121

[52] U.S. Cl................ 195/28 R; 195/36 R; 195/37; 195/47; 195/111
[51] Int. Cl............................................ C12b 1/00
[58] Field of Search............ 195/28 R, 36 R, 37, 47, 195/111

[56] References Cited
UNITED STATES PATENTS
3,655,510   4/1972   Tanaka et al...................... 195/111

FOREIGN PATENTS OR APPLICATIONS
45-36,156   11/1970   Japan................................ 195/111

*Primary Examiner*—A. Louis Monacell
*Assistant Examiner*—R. B. Penland
*Attorney, Agent, or Firm*—Sughrue, Rothwell, Mion, Zinn and Macpeak

[57] ABSTRACT

A fermentation process for producing L-lysine comprising aerobically culturing a mixture of (1) a hydrocarbon-assimilating and L-lysine producing bacterium and (2) at least one hydrocarbon-non-assimilating microorganism in a nutrient medium which contains a hydrocarbon or a mixture of hydrocarbons as a main carbon source, and recovering said L-lysine from said medium.

10 Claims, No Drawings

3,888,737

PROCESS OF PRODUCING L-LYSINE USING MIXED MICROORGANISMS

BACKGROUND OF THE INVENTION

1. Field of the Invention

This invention relates to the production of L-lysine from hydrocarbons, and, more particularly, to a method of producing L-lysine by fermentation employing at least two kinds of microorganisms. Even more particularly, it relates to a process for the production of L-lysine by fermentation using a hydrocarbon-assimilating bacterium which has the ability to produce L-lysine and at least one hydrocarbon-non-assimilating strain of microorganisms, culturing aerobically the hydrocarbon-assimilating and L-lysine producing microorganism in combination with the hydrocarbon non-assimilating microorganisms in a medium containing hydrocarbons, nitrogen sources, inorganics and the like, and recovering the L-lysine from the medium.

2. Description of the Prior Art

L-Lysine is well known as an indispensable amino acid for humans and animals, and a wide use thereof as additives is anticipated for the enrichment of foods and feed-stuffs.

The production of L-Lysine from hydrocarbons by fermentation is known for example, as disclosed in U.S. Pat. No. 3,222,258. However, methods using hydrocarbons are disadvantageous in that the time required for the fermentation is relatively long in comparison with well-known methods using carbohydrates, and that the yield of the L-lysine is often variable and low due to an increased chance of contamination with various foreign microorganisms which often disadvantageously affect the process of fermentation.

SUMMARY OF THE INVENTION

An object of the present invention is to provide an improved process for the production of L-lysine by fermentation which overcomes the disadvantages and deficiencies of the prior-art methods.

Another object of the present invention is to provide L-lysine at low cost from readily available raw materials, such as hydrocarbons, using an improved method which can be carried out in a stable and efficient manner on an industrial scale.

This invention provides a fermentation process for producing L-lysine with the process comprising aerobically culturing a mixture of (1) a hydrocarbon-assimilating and L-lysine producing bacterium and (2) at least one hydrocarbon-non-assimilating microorganism in a nutrient medium in which a hydrocarbon or a mixture of hydrocarbons is the predominant carbon source, and recovering L-lysine from the medium.

DETAILED DESCRIPTION OF THE INVENTION

The present inventors have found that microbial strains which are capable of assimilating hydrocarbons have a high capability for producing L-lysine from hydrocarbons.

Optimal cultural conditions for the production of L-lysine have been investigated using these L-lysine-producing strains. It has been found that the culture was often contaminated with various kinds of microorganisms in a fermentor such as jar fermentor, and the yield of L-lysine was greatly affected by the contaminating microorganisms. Thus, the present inventors have studied the contaminating microorganisms and the effects of these microorganisms on the production of L-lysine by a hydro-carbon-assimilating bacterium for the purpose of establishing a more advantageous process for producing L-lysine by fermentation on an industrial scale and have accomplished this invention and its unexpected results. In the course of this work, it was found that the production of L-lysine was greatly improved by affirmatively mixing certain kinds of microorganisms selected from those microorganisms which do not assimilate hydrocarbons with an L-lysine-producing strain, and culturing the mixture of these microorganisms in a medium which contains hydrocarbons as the main carbon source.

One of the most important advantages of the present invention is that the growth of these contaminating microorganisms is greatly inhibited and the adverse effects of microorganisms which might contaminate during the fermentation are minimized, and thus a reproducible and high yield of L-lysine is obtained.

Another advantage is the time required for the fermentation is greatly reduced. A further advantage is the yield of L-lysine is greatly improved.

The mechanism of the effect of a mixed culture is not yet clear, and while not desiring to be bound, the present inventors believe that the advantageous effects of the present method presumably arise from following phenomena. The chances of contamination may be decreased by the presence of the pre-mixed microorganisms. It was found by the present inventors that most of the contaminating microorganisms during the fermentation do not assimilate hydrocarbons which were used as the main carbon source but rather grow by assimilating the metabolites produced by hydro-carbon-assimilating microorganisms. Therefore, the chane of a contamination would appear to decrease if the mixed microorganisms consume the metabolites produced. In addition, the microorganisms which were found to be effective in L-lysine production did not always assimilate efficiently the metabolites produced. Therefore, another mechanism is also possible. For instance, the process of the fermentation may be improved by the formation of L-lysine production promoting substances in which the mixed microorganisms are involved.

The scope of the present invention is not to be limited, however, by the above discussion and the discussion is given only for the purposes of facilitating a better understanding of the invention.

As described below, the microorganisms employed in combination with the microorganisms which produce L-lysine have little capability for L-lysine production even when carbohydrates are used as the carbon source. The term "hydrocarbon non-assimilating microorganism" as employed herein is used to describe those microorganisms which have a low or substantially no ability to assimilate hydrocarbons as a carbon-source. Therefore, it is apparent that the present invention is different from the process disclosed in U.S. Pat. No. 3,655,510, in which a mixture of (1) a microorganism capable of assimilating hydrocarbons and (2) a microorganism capable of producing amino acids is used for the production of amino acids.

Thus, the process of the present invention has been developed by the present inventors based on a careful examination of the aspects concerning L-lysine fermentation using hydrocarbons as the carbon source. While the description and discussion contained is predominantly directed to the production of L-lysine using fermentation, it will be easily recognized that this process is applicable to and can be employed in other fermentation processes such as the production of amino acids or other microbial metabolite production substantially using hydrocarbons as the carbon source.

A wide range of microorganisms which have a hydrocarbon-assimilating and L-lysine producing ability directly from hydrocarbons can be employed in accordance with the present invention. The L-lysine producible strains can be obtained from the hydro-carbon-assimilating microorganisms using artificial mutation techniques known in the art (for example, as disclosed in U.S. Pat. No. 3,759,789, and British Pat. No. 1,304,067). Among such strains are included the L-lysine producing strains derived from bacteria belonging to the genera of Pseudomonas, Arthrobacter, Achromobacter, Micrococcus, Corynebacterium, Brevibacterium, Acinetobacter, Alkaligenes and Nocardia which can assimilate hydrocarbons.

Examples of preferred mutants are *Pseudomonas brevis* ATCC-21941 (valine-resistant strain), *Achromobacter coagulans* ATCC-21936 (a-amino butyrate and norvaline-resistant strain), *Arthrobacter alkanicus* M-1554 (threonine-resistant strain) which were derived using an artificial mutation technique and have a high productivity for L-lysine. The details of the mutation technique are described in U.S. Pat. No. 3,222,258 and U.S. patent application Ser. No. 384,844 filed Aug. 2, 1973. These microorganism strains can be used alone or in combination as desired.

The hydrocarbon non-assimilating microorganisms which can be suitably used are found among various kinds of strains belonging to the family of bacteria, fungi, yeast or actinomyces which cannot assimilate hydrocarbons and preferably do not decompose the L-lysine accumulated in the culture broth during the fermentation process.

The preferred strains are efficiently found among the microorganisms which grow in the solution obtained after separation of microbial cells and L-lysine from the cultured broth, using a centrifuge and then an ion exchange resin, where a lysine-producing strain is cultured aerobically in a hydrocarbon-containing medium. The strains which can be used for fermentation as the hydrocarbon non-assimilating microorganisms in accordance with the present invention are as follows.

Bacteria belonging to the genera Bacillus, Pseudomonas, Corynebacterium, Microbacterium, Micrococcus, Brevibacterium, Aerobacter, Aeromonas, Escherichia coli, Proteus, Flavobacterium and the like.

As representative examples of bacterial strains, *Bacillus subtilis* (IAM-1130*), *Bacillus megatherium* (IAM-1145), *Bacillus polymyxa* (IAM-1189), *Pseudomonas xanthe* (IAM-1310), *Microbacterium flavum* (ATCC-10340), *Micrococcus candidus* (ATCC-14852), *Micrococcus lysodeikticus* (IAM-1313), *Corynebacterium faciens* (IAM-1079), *Brevibacterium ammoniagenes* (IAM-1641), *Acromonas formicans* (ATCC-13137), *Escherichia coli* K-13, *Proteus vulgaris* (IAM-1025) can be employed. Additional representative examples of microorganisms are as follows:

Fungi belonging to the genera Penicillium and Aspergillus, with representative strains being *Aspergillus niger* (IAM-3008) and *Penicillium citrinum* (ATCC-9849);

Actinomycetes belonging to the genera Streptomyces and Actinomyces with representative strains being *Streptomyces mitakaensis* (ATCC-15297), *Streptomyces hygroscopicus* (ATCC-10976), *Streptomycas griseus* (ATCC-23345), *Streptomyces virginiae* (ATCC-19817), and *Streptomyces albus* (ATCC-3381);

Yeast belonging to the genera Rhodotorula, Zygosaccharomyces, Debaryomyces and Trichosporon.

*Institute of Applied Microbiology University of Tokyo, Japan

These strains can be used alone or in a combination of more than two strains. The mutant strains such as auxotrophs, analogues-resistant or temperature sensitive mutants derived from above-described strains can also be employed. These mutants can be obtained using techniques well-known in the art.

A seed culture medium is inoculated with the L-lysine-producing bacteria and the hydrocarbon non-assimilating strain or strains, the inoculated seed culture medium is cultured aerobically and a fermentation medium is then inoculated with the seed which contains the mixture of the two kinds of microorganisms, i.e., the L-lysine-producing microorganisms and the hydrocarbon non-assimilating microorganisms. Alternatively, the mixture of the two kinds of microorganisms can be cultured individually in seed media and the seed media thus obtained are mixed before the fermentation.

The hydrocarbon non-assimilating microorganisms can be mixed intermittently during the fermentation using an L-lysine-producing bacterium. The mixing ratio and the time at which the mixed strains are added to the fermentation medium can be appropriately selected in each case. A ratio (weight of cells) of about 1 to 100 of the mixed microorganisms to 100 of the L-lysine producing strain is often preferable.

The mixed seed culture in which two kinds of strains as described above are grown in a seed culture medium is often effective and convenient for the prevention of contamination and for the production of L-lysine. Either a synthetic culture medium containing hydrocarbons or a natural nutrient medium is suitable for the seed culture. For example, a synthetic medium containing n-paraffin(s), potassium phosphate, magnesium sulfate, ammonium sulfate and peptone, or a nutrient bouillon medium can be used as a seed culture medium. A synthetic medium containing 0.5 to 2.0% n-paraffin is often preferable.

In carrying out the L-lysine production in accordance with the present invention, the two kinds of strains described hereinbefore (i.e., the hydrocarbon assimilating and hydrocarbon-non-assimilating) are aerobically cultured in the culture medium containing hydrocarbons as a main carbon source, nitrogen sources, inorganic salts and other additives.

Hydrocarbons which can preferably be used in the culture medium in the process of this invention for the production of L-lysine are n-paraffins containing 10 to 20 carbon atoms with n-paraffins containing 13 to 18 carbon atoms being particularly preferred. The concentration of hydrocarbons in the medium for the production of L-lysine is usually 5 to 20% weight per volume.

Nitrogen sources which can be used in the culture medium include organic or inorganic ammonium salts such as ammonium sulfate, ammonium nitrate, ammonium chloride, ammonium acetate, ammonium succinate, ammonium fumarate, urea, ammonia and the like. Nitrogen sources are incorporated both in the microbial cells and L-lysine. Therefore, sufficient amounts of the nitrogen sources must be added to the medium in order to obtain a good yield of L-lysine. Since a high concentration of nitrogen source, for instance more than 4.0% weight per volume of ammonium sulfate, may inhibit the cell growth, an intermittent addition of the nitrogen source is often effective.

Inorganic salts which can be used in the present invention include potassium phosphate, magnesium sulfate, manganese sulfate, zinc sulfate, copper sulfate, ferrous sulfate, calcium carbonate and the like.

The addition of organic compounds such as yeast extracts, corn steep liquor, NZ-amine, peptone, soybean meal, soybean oil, glycerol, sorbitol, glucose or various organic acids such as amino acids, tricarboxylic acids or fatty acids as a minor additives often stimulates the effects of the mixed culture or the production of L-lysine.

The addition of surface active agents often gives a good effect on the fermentation. A type of non-ionic surface active agents is usually suitable. For example, polyoxyethylene sorbitan mono- or trioleate (Tween 80 or Tween 85, trade name produced by Atlas Powder Co., U.S.A.) can be effectively used in the culture medium in an amount of approximately 0.02 to 0.5% by weight based on the total amount of the culture medium.

The pH of the culture medium is maintained in the range of about 5.5 to 9.0, preferably about 6 to 8.5 during the entire cultivation period. The cultivation is carried out at a temperature of about 25° to 45°C, preferably between 28° and 37°C. It is necessary that the cultivation be conducted under aerobic conditions, for example, by stirring with aeration in a fermentor or by shake-culturing in a flask. Upon completion of the cultivation, the resulting microbial cells can be removed from the culture broth using well-known techniques such as filtration or centrifuging. The removal of the microbial cells can also be easily carried out by heating the resultant cultural broth at about 70° to 100°C.

The desired L-lysine can be obtained from the filtrate or the supernatant in the form of L-lysine hydrochloride in accordance with well-known procedures using an ion-exchange resin such as Amberlite IR-120 (H type), a strong cationic exchange resin, or Amberlite IRC-50 (H type), a weak cationic exchange resin.

The following examples are given to illustrate the invention in greater detail. Unless otherwise indicated, all parts, percents, ratios and the like are by weight.

EXAMPLE 1

Pseudomonas brevis (ATCC-21941) as a hydrocarbon assimilating and L-lysine producing microorganism was cultured on a bouillon agar slant at 33°C for 24 hours, and then was used to inoculate the following seed culture medium and was then cultured at 33°C.

The composition of the seed culture medium was as follows: n-paraffin ($C_{11}$ - $C_{18}$) 5 g/l, 75% $H_3PO_4$ 12 ml/l, $(NH_4)_2SO_4$ 6 g/l, NaCl 1 g/l, $MgSO_4·7H_2O$ 0.2 g/l, $CaCl_2·2H_2O$ 0.1 g/l, $FeSO_4·7H_2O$ 0.1 g/l, $ZnSO_4·7H_2O$ 0.03 g/l, and $MnSO_4·4H_2O$ 0.0002 g/l. The pH was adjusted to about 7.0 with KOH. This seed medium was also employed in the other Examples hereinafter. After 24 hours, 1 ml of the above described seed culture (inoculum ratio ca. 3%) was used to inoculate 30 ml of a fermentation medium in shaking-flasks which was sterilized at 120°C for 30 min. and cultured with shaking at 33°C. The composition of the fermentation medium was as follows:

| | |
|---|---|
| n-Paraffin ($C_{11}$ ~ $C_{18}$) | 11.6 % (w/v) |
| $K_2HPO_4$ | 0.1 " |
| $KH_2PO_4$ | 0.1 " |
| $MgSO_4·7H_2O$ | 0.1 " |
| $FeSO_4·7H_2O$ | 0.001 " |
| $ZnSO_4·7H_2O$ | 0.001 " |
| $MnSO_4·4H_2O$ | 0.005 " |
| $CaCl_3$ | 3.0 " |
| $(NH_4)_2SO_4$ | 3.5 " |
| Yeast extracts | 0.1 " |
| Tween 85 | 0.1 " |
| pH | 7.0 |

After 24 hours from the beginning of the cultivation, a platinum loopful amount of each of the hydrocarbon non-assimilating bacteria as shown in Table 1 below was used to inoculate the culture to provide a mixed culture and the culturing was continued for 9 days. A control culture was also conducted using only the Pseudomonas brevis for the purposes of comparison. The concentration of L-lysine (as the hydrochloride) produced in the broth of each of the fermentations was measured at 7 and 9 days using a microbioassay method in which an L-lysine auxotroph of Escherichia coli or Leuconostoc mesentroides is used. The results obtained are shown in Table 1.

Table 1

| Strains of Mixed Bacteria | L-Lysine (HCl) Accumulated | |
|---|---|---|
| | 7 Days (mg/ml) | 9 Days (mg/ml) |
| Pseudomonas brevis Control* | 20.5 | 26.0 |
| Pseudomonas brevis plus | | |
| Bacillus megatherium IAM-1030 | 25.0 | 30.0 |
| Bacillus subtilis IAM-1145 | 24.0 | 30.0 |
| Bacillus polymyxa IAM-1189 | 30.0 | 32.8 |
| Microbacterium flavum ATCC-10340 | 30.5 | 34.5 |
| Microbacterium lacticum IAM-1640 | 28.0 | 30.0 |
| Micrococcus candidus ATCC-14852 | 32.8 | 32.8 |
| Brevibacterium ammoniagenes IAM-1641 | 28.8 | 30.8 |
| Aeromonas formicans ATCC-13137 | 35.0 | 34.4 |
| Aerobacter clocae IAM-1020 | 27.6 | 29.0 |
| Escherichia coli K-12 | 34.0 | 36.8 |
| Corynebacterium faciens IAM-1079 | 31.2 | 25.6 |
| Corynebacterium rathayi ATCC-13659 | 28.0 | 30.8 |
| Proteus vulgaris IAM-1025 | 31.2 | 29.5 |

*Single culture using Pseudomonas brevis only

As shown by the results in Table 1 above, the production of L-lysine was greatly improved when a mixed culture of the hydrocarbon assimilating microorganism and the hydrocarbon non-assimilating microorganism was employed.

The time required to reach the maximum yield was 7 to 9 days in the case of a mixed culture, while it was 10 to 11 days in the case of a single culture. Moreover, it was found that the microbial cells were easily removed by filtration or centrifuging after heating the broth at 80° to 100°C.

It was also found that the capability for L-lysine production of the mixed microorganisms listed above was either quite low or substantially non-existent even when they were cultured in a medium containing a carbohydrate as a carbon source. Thus, it was supposed that the advantageous effect of the mixed culture method was not due to the production of L-lysine by the hydrocarbon non-assimilating microorganisms, but, for instance, to a stimulating effect by the inoculation of the microorganisms.

EXAMPLE 2

A similar procedure was carried out using *Achromobacter coagulans* ATCC-21936 and *Arthrobacter alkanicus* M-1554 as L-lysine-producing strains and *Microbacterium flavum* ATCC-10340 as a strain as a hydrocarbon-non-assimilating strain for a culture in the same manner as described in Example 1, and the results obtained were as follows:

| L-lysine Producing Strain | Type Culture | L-Lysine(HCl) (g/l) |
|---|---|---|
| *Achromobacter coagulans* ATCC-21936 | Single Culture | 7.8 |
| " | Mixed Culture | 9.5 |
| *Arthrobacter alkanicus* M-1554 | Single Culture | 1.5 |
| " | Mixed Culture | 2.8 |

EXAMPLE 3

Several strains of actinomyces, fungi or yeast as hydrocarbon non-assimilating microorganisms as shown in Table 2 were cultured in the following seed media at 33°C for 48 hours.

| Seed Medium for Fungi: | % |
|---|---|
| Sucrose | 3.0 |
| $K_2HPO_4$ | 0.1 |
| $NaNO_3$ | 0.2 |
| KCl | 0.05 |
| $MgSO_4.7H_2O$ | 0.05 |
| $FeSO_4.7H_2O$ | 0.01 |
| pH | 7.0 |

| Seed Medium for Actinomyces: | % |
|---|---|
| Glucose | 1.0 |
| Peptone | 0.2 |
| Meat Extracts | 0.1 |
| Yeast Extracts | 0.1 |
| pH | 7.0 |

The yeast strain was inoculated from a malt-extracts agar slant using a platinum loop. The seed culture thus obtained was used to inoculate at an inoculum ratio of 5% (v/v) initially or after 24 hours from the beginning of the fermentation a fermentation medium inoculated with *Pseudomonas brevis* No. 56 (ATCC-21941) as described in Example 1 as a hydrocarbon assimilating and L-lysine producing microorganism and cultured with shaking at 33°C for 10 days. The fermentation medium described in Example 1 was used. The results obtained are shown in Table 2.

Table 2

| Strains of Mixed Microorganisms | Time of* Mixing | L-Lysine (HCl) Produced (g/l) |
|---|---|---|
| *Pseudomonas brevis* Control | | 28.4 |
| *Pseudomonas brevis* plus | | |
| *Streptomyces virginiae* | a | 29.2 |
| (ATCC-12630) | b | 31.0 |
| *Streptomyces mitakaensis* | a | 36.8 |
| (ATCC-15297) | b | 34.0 |
| *Streptomyces albus* | a | 31.2 |
| (ATCC-12648) | b | 33.2 |
| *Streptomyces hygroscopicus* | a | 35.6 |
| (IFO-3192) | b | 38.4 |
| *Streptomyces griseus* | a | 36.4 |
| (ATCC-23345) | b | 38.4 |
| *Penicillium citrinum* | a | 31.2 |
| (ATCC-8506) | b | 38.4 |
| *Aspergillus niger* | a | 42.4 |
| (IAM-3008) | b | 45.2 |
| *Rhodotorula minuta* | a | 30.5 |
| (IFO-0387) | | |

Table 2-Continued

| Strains of Mixed Microorganisms | Time of* Mixing | L-Lysine (HCl) Produced (g/l) |
|---|---|---|
| *Candida utilis* (IAM-4277) | a | 31.8 | a: Mixed at the beginning of the fermentation
b: Mixed after 24 hours from the beginning

EXAMPLE 4

*Pseudomonas brevis* No. 56 (ATCC-21947) grown on a bouillon agar slant was used to inoculate 600 ml of a seed culture medium as described in Example 1 which was sterilized at 120°C for 20 min. in a 2 l shaking flask and cultured at 33°C for 24 hours with shaking. The seed culture was used to inoculate 20 l of a fermentation medium in a jar fermentor of a volume of 30 l and cultured aerobically at 33°C.

*Microbacterium flavum* grown on a bouillon agar medium distributed in a 1 l Roux flask at 33°C for 24 hours was suspended in 300 ml of sterilized saline solution, and this suspension was added to the fermentation medium described in Example 1 at the beginning or after 24 hours from the beginning of the fermentation. The pH was adjusted between 6.5 and 8.0 by the addition of aqueous ammonia solution during the entire fermentation period. The results obtained are shown in Table 3.

Table 3

| No. | | L-Lysine Accumulated (g/l) | Culturing Time (hours) |
|---|---|---|---|
| 1 | Control (single culture) | 38.0 | 95 |
| 2 | Mixed Culture Added at the Beginning of the Fermentation | 45.8 | 68 |
| 3 | Mixed Culture Added 24 hours after the Beginning of the Fermentation | 42.4 | 78 |

After the completion of the cultivation, the cells were removed, and one liter of the filtrate obtained (No. 3 in Table 3) was passed through an ion exchange resin, Amberlite IRC-50 (H type), and the L-lysine adsorbed on the resin was eluted with an aqueous solution of ammonia. The eluate was concentrated and then 36.5 g/l of L-lysine (HCl) was obtained by the addition of alcohol.

EXAMPLE 5

The microbial cells were removed from the cultured broth described in Example 4 (single culture of *Ps. brevis* No. 56) using a centrifuge, and then the L-lysine was removed by passing the supernatant liquid through an Amberlite IR-120 (H type) column. The effluent was neutralized with a NaOH solution. This solution contained certain metabolites other than the L-lysine accumulated during the L-lysine fermentation. Various microorganisms which can assimilate the metabolites in the above-described solution were selected from soil samples. Such microorganisms were isolated using an enrichment method after cultivating in a medium which contained the above-described solution as the main carbon source. The medium for the enrichment culture can be, for instance, as follows:

| | |
|---|---|
| Solution described above | 1 l |
| $MgSO_4.7H_2O$ | 0.2 g |
| $(NH_4)_2SO_4$ | 2 g |
| $K_2HPO_4$ | 5 g |
| $KH_2PO_4$ | 2 g |
| pH | 7.0 |

Ten ml of the medium was distributed in test tubes of 70 ml volume and sterilized at 120°C for 10 minutes. About 2 g of soil which was obtained from various natural environments was suspended in 10 ml of saline water, 1 ml of the supernatant was added to the medium for an enrichment culture, and cultured with shaking at 33°C for 24 hours. Then, microorganisms were isolated using a well-known technique after plating and culturing a diluted solution of the obtained culture broth on a bouillon agar medium or on the enrichment culture medium containing also 2% by weight of agar.

The mixed microorganisms for the L-lysine production were selected from the microorganisms thus obtained on the conditions that the strain selected did not decompose L-lysine and also did not assimilate hydrocarbons.

The activity toward L-lysine decomposition can easily be tested by incubating the intact cells of a microorganism in a buffer solution (pH 7.0) containing L-lysine and by measuring the change in the L-lysine concentration.

It was found that the microorganisms which give a yellow or yellowish-brown colony on a bouillon agar medium are often suitable for the hydrocarbon non-assimilating microorganisms.

*Ps. brevis* No. 56 (ATCC-21941) and a bacterial strain which was isolated using the above-described procedure were used to inoculate a seed medium containing additionally 0.3% of peptone, the basal medium thereof was as described in Example 1, and cultured at 33°C for 24 hours. The obtained seed culture which contained two kinds of bacterial strains was used to inoculate a fermentation medium in a jar fermentor at the inoculating ratio of 5%, and cultured aerobically in a similar manner as described in Example 4. For comparison, a single culture of *Ps. brevis* No. 56 was carried out simultaneously with the mixed culture. Eight replications of the experiments were conducted and the results obtained are shown in Table 4.

Table 4

| | L-lysine (HCl) Produced (g/l) | | |
|---|---|---|---|
| | Average | Maximum | Minimum |
| 1. Control (single culture) | 23.5 | 39.1 | 12.8 |
| 2. Mixed Culture | 38.6 | 46.2 | 30.4 |

It is apparent from the description of the invention and the results set forth in the specific examples thereof that the production of L-lysine was greatly stabilized by employing a mixed culture.

EXAMPLE 6

In order to confirm the ability of the mixed culture to prevent the adverse effects of contamination, a bacterial strain which was isolated from the contaminated microorganisms during L-lysine fermentation was added at a concentration of $10^5 \sim 10^6$ cells per ml after 24 hours from the start of the fermentation in Example 5.

After 80 hours, the concentration of L-lysine (HCl) was 19.5 g/l in the case of a single culture and 36.2 g/l in the case of a mixed culture.

While the invention has been described in detail and in terms of preferred embodiments thereof, it is apparent that various changes and modifications can be made therein without departing from the spirit and scope thereof.

What is claimed is:

1. A fermentation process for producing L-lysine comprising aerobically culturing a mixture of (1) a hydrocarbon-assimilating and L-lysine producing bacterium and (2) at least one hydro-carbon non-assimilating microorganism which has low capability for L-lysine production in a nutrient medium which contains a hydrocarbon or a mixture of hydrocarbon as a main carbon source, and recovering said L-lysine from said medium.

2. The process of claim 1, wherein said hydrocarbon-assimilating and L-lysine producing bacterium belongs to a genus of Pseudomonas, Achromobacter, Arthrobacter, Micrococcus, Corynobacterium, Brevibacterium, Acinetobacter, Alkaligenes or Nocardia.

3. The process of claim 1, wherein said hydrocarbon-non-assimilating microorganism belongs to the family of bacteria, fungi, actinomyces or yeasts.

4. The process of claim 1, wherein said hydrocarbon-non-assimilating microorganism is selected from microorganisms which can grow on the medium containing the metabolites except L-lysine produced by said hydrocarbon-assimilating and L-lysine producing bacteriumm.

5. The process of claim 1, wherein said hydrocarbon-non-assimilating bacterium is selected from bacterial strain which give a yellow or yellowish-brown colony on a bouillon agar medium.

6. The process of claim 1, including inoculating and cultureing said mixture in a seed medium to produce a seed culture and inoculating a fermentation medium with the seed culture.

7. The process of claim 1, wherein said recovering includes heating the culture medium and removing the microbial cells from the culture medium.

8. The process of claim 1, wherein said culturing comprises a fermentative culturing at a temperature of 25° to 45°C and at a pH of 5.5 to 9.0.

9. The process of claim 1, wherein said hydrocarbons are selected from the group consisting of aliphatic hydrocarbons having from 10 to 20 carbon atoms and crude petroleum hydrocarbons.

10. The process of claim 1, where said hydrocarbon is an n-paraffin having 10 to 20 carbon atoms.

* * * * *